United States Patent
Krishnamurthy et al.

(10) Patent No.: US 9,621,475 B2
(45) Date of Patent: *Apr. 11, 2017

(54) INTERNET-WIDE SCHEDULING OF TRANSACTIONS

(71) Applicant: AT&T Intellectual Property II, L.P., Atlanta, GA (US)

(72) Inventors: Balachander Krishnamurthy, New York, NY (US); Harsha Madhyastha, Seattle, WA (US); Oliver Spatscheck, Randolph, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/797,992

(22) Filed: Jul. 13, 2015

(65) Prior Publication Data

US 2016/0006662 A1    Jan. 7, 2016

Related U.S. Application Data

(63) Continuation of application No. 13/858,371, filed on Apr. 8, 2013, now Pat. No. 9,118,560, which is a
(Continued)

(51) Int. Cl.
*G06F 15/173* (2006.01)
*H04L 12/823* (2013.01)
*H04L 12/26* (2006.01)
*H04L 12/24* (2006.01)
*H04L 29/08* (2006.01)

(52) U.S. Cl.
CPC .......... *H04L 47/32* (2013.01); *H04L 12/2602* (2013.01); *H04L 41/5009* (2013.01); *H04L 41/509* (2013.01); *H04L 43/00* (2013.01); *H04L 43/0823* (2013.01); *H04L 43/0876* (2013.01);
(Continued)

(58) Field of Classification Search
CPC ... H04L 47/32; H04L 43/0823; H04L 67/325; H04L 43/0876; H04L 41/5009; H04L 43/16; H04L 12/2602; H04L 43/00; H04L 43/0882; H04L 41/509
See application file for complete search history.

(56) References Cited

U.S. PATENT DOCUMENTS 5,406,557 A  4/1995 Baudoin
6,055,570 A  4/2000 Nielsen
(Continued)

OTHER PUBLICATIONS

Search Report mailed on Mar. 11, 2013, in connection with European Patent Application No. 07122800.1-1244, 7 pgs.
(Continued)

*Primary Examiner* — Brian P Whipple
(74) *Attorney, Agent, or Firm* — Chiesa Shahinian & Giantomasi PC

(57) ABSTRACT

A method and system for distributing content on a network through network-wide transactions is disclosed. The method and system monitors the network using triggered measurement of the performance of an element of the network, dynamically computing, based on the monitoring, the regions of the network with available performance capacity for the transaction to proceed at a given time, determining, based on the computing, a scheduled time for the transaction to proceed, and distributing the content according to a schedule related to the scheduled time.

20 Claims, 6 Drawing Sheets

Related U.S. Application Data continuation of application No. 11/646,853, filed on Dec. 28, 2006, now Pat. No. 8,438,267.

(52) U.S. Cl.
CPC .......... *H04L 43/0882* (2013.01); *H04L 43/16* (2013.01); *H04L 67/325* (2013.01)

(56) References Cited

U.S. PATENT DOCUMENTS

| | | |
|---|---|---|
| 6,081,840 A | 6/2000 | Zhao |
| 6,209,033 B1 | 3/2001 | Datta et al. |
| 6,477,180 B1 | 11/2002 | Aggarwal et al. |
| 6,662,322 B1 | 12/2003 | Abdelilah et al. |
| 6,862,618 B1 | 3/2005 | Gray et al. |
| 7,080,051 B1 | 7/2006 | Crawford |
| 7,099,320 B1 | 8/2006 | Salerno |
| 7,406,310 B2 | 7/2008 | Okita et al. |
| 7,633,945 B1 | 12/2009 | Sakoda et al. |
| 8,032,658 B2 | 10/2011 | Tripathi |
| 2001/0014103 A1 | 8/2001 | Burns et al. |
| 2003/0093476 A1 | 5/2003 | Syed |
| 2003/0126244 A1 | 7/2003 | Smith et al. |
| 2004/0015611 A1 | 1/2004 | Kim |
| 2004/0031028 A1 | 2/2004 | Hunt et al. |
| 2005/0071851 A1 | 3/2005 | Opheim |
| 2005/0157649 A1 | 7/2005 | Shin |
| 2006/0179127 A1 | 8/2006 | Randall |
| 2009/0013175 A1 | 1/2009 | Elliott |

OTHER PUBLICATIONS

Krishnamurthy, et al.; "Atmen: A Triggered Network Measurement Infrastructure", 14th Int'l Conference on World Wide Web, 2005, pp. 499-509.

INTERNET-WIDE SCHEDULING OF TRANSACTIONS

The present application is a continuation of prior application Ser. No. 13/858,371 filed Apr. 8, 2013, which is a continuation of prior application Ser. No. 11/646,853 filed Dec. 28, 2006 and issued as U.S. Pat. No. 8,438,267 on May 7, 2013, the disclosures of which are herein incorporated by reference in their entirety.

BACKGROUND OF THE INVENTION

The present invention relates generally to distributing content on a network, and more particularly to scheduling the distribution of content on the network based on measurement of network parameters.

Public networks, and most notably the Internet, are emerging as a primary conduit for communications, entertainment, and business services. The Internet is a cooperative interconnection of computing networks, including local and wide area networks. In the Internet, computers from around the world with existing and even incompatible technologies are interconnected by employing common protocols that smoothly integrate the individual and diverse components that are interconnected.

The Internet has recently been popularized by the overwhelming and rapid success of the World Wide Web (WWW or Web). Broadly, the Web is the universe of Internet accessible information. In somewhat narrower scope the Web refers to all the resources and users on the internet that use the Hypertext Transfer Protocol ("HTTP"). Internet servers on the Web generally support documents formatted using HTML that enable linking to other documents as well as graphics, audio and video files. Linking is performed by "pointing and clicking" at link icons in a document permitting one to jump from one document to another. This amounts to a graphical user interface to the Internet that facilitates interaction between users and the Internet. The Web links together various topics in a complex, non-sequential web of associations which permit a user to browse from one topic to another, regardless of the presented order of topics. A "Web browser" is an application which executes on the user's computer to navigate the Web. The Web browser allows a user to retrieve and render hypermedia content from the WWW, including text, sound, images, video, and other data.

Content delivery via data networks including the internet is becoming increasingly popular. There are numerous content providers disseminating content via the Internet to various customers. The content providers make this information available to users via websites, and end users access the information using web browsers. So-called "web surfing" of websites using an Internet browser is well known in the art.

The internet is also used by many administrative entities to perform numerous "transactions" as part of services they offer to their customers. The term transaction as used herein refers to any operation using the Internet. Commercial ISPs may update databases. Networked games providers may update new versions of software of games so players can obtain them. Measurement platforms, replication and mirroring entities also have a need to do synchronized or staggered updates. The efficient completion of the transactions may be hampered by various factors that cause delays in transmission across the Internet. These delays may be due to, for example, disruptions in the internet associated with various network events, normal congestion associated with traffic spikes or breaks in Internet links. Measurement of network performance is therefore of great interest, and one technique, using stimulated or "triggered" queries, is disclosed in commonly assigned and copending U.S. patent application Ser. No. 10/945,240, incorporated herein by reference. However, there remains a need to efficiently schedule transactions taking into account variations in network performance over the internet.

BRIEF SUMMARY OF THE INVENTION

In accordance with an embodiment of the invention, a method and system for distributing content over a network through network-wide transactions is described. The method and system includes monitoring the network using triggered measurement of the performance of an element of the network, dynamically computing, based on the monitoring, the regions of the network with available performance capacity for the transaction to proceed at a given time, determining, based on the computing, a scheduled time for the transaction to proceed, and distributing the content according to a schedule related to the scheduled time.

The method and system may also include checking the scheduled time using historic measurement information, checking the scheduled time using dynamic checks of the network and partitioning the transaction.

Scheduling the transaction may be based on the load on the network, the failures of the network at certain protocol layers and on performance levels falling below certain pre-defined thresholds. The network may be the internet.

These and other advantages of the invention will be apparent to those of ordinary skill in the art by reference to the following detailed description and the accompanying drawings.

DETAILED DESCRIPTION

Figure 1:
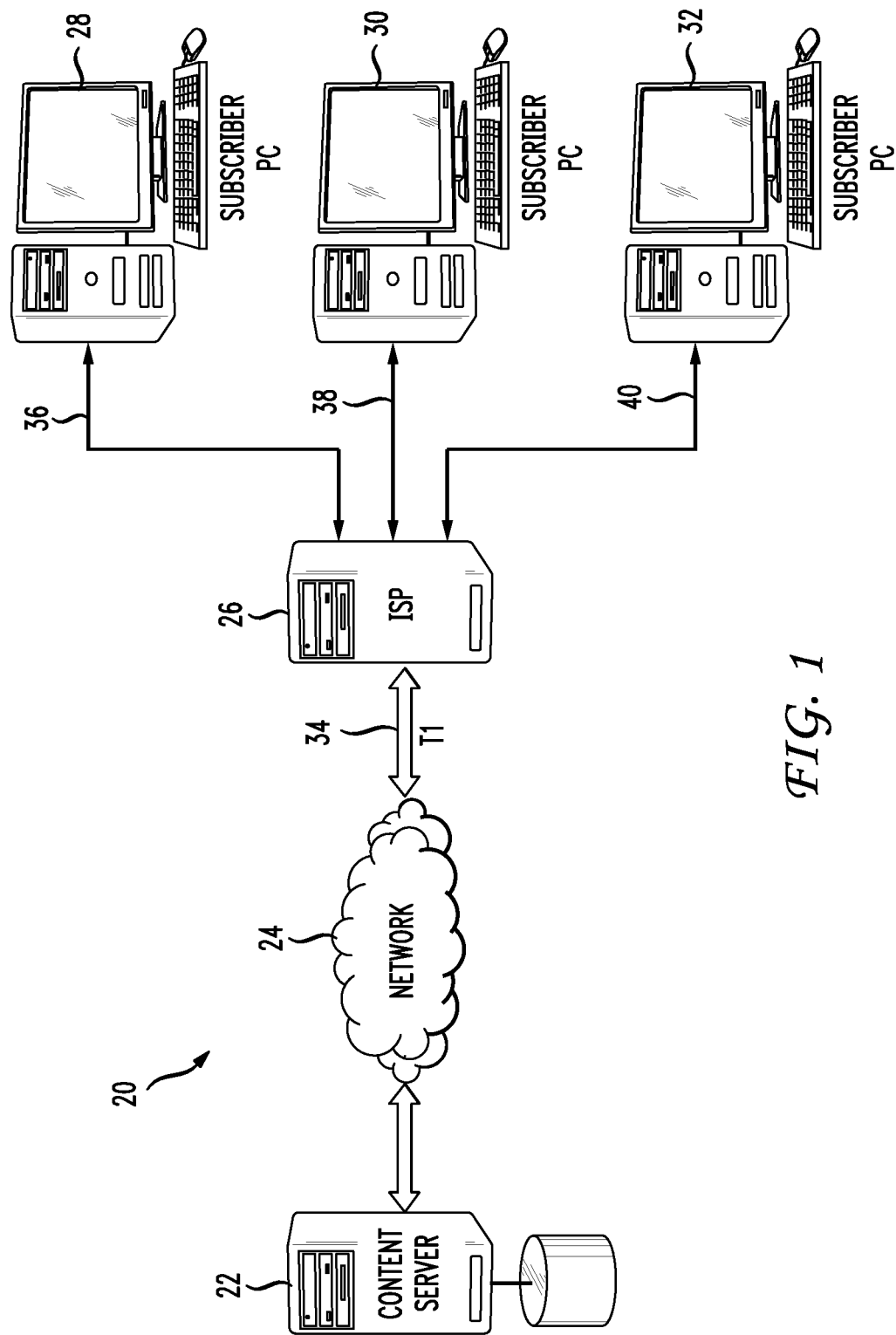
FIG. 1 is an illustration of a network system that used internet technology.

FIG. 1 shows a model of network technology 20. The network technology 20 includes a content server 22 which stores and serves data over a distribution network 24 such as the Internet. The network technology 20 also includes regional independent service providers (ISPs) or point of presence (POP) operators, as represented by ISP 26, which provide the connectivity to the network 24. Many users, as represented by subscriber computers 28, 30, and 32, are connected to the ISP 26 to gain access to the network 24. The ISP 26 is connected to the network 24 with a network connection 34. The subscriber computers 28, 30, and 32 are connected to their host ISP 26 via home entry lines, such as telephone or cable lines, and compatible modems.

The ISP 26 can accommodate simultaneous requests from a number of subscribers. As more subscribers utilize the ISP services, however, there is less available bandwidth to satisfy the subscribers' requests. If too many requests are received, the ISP 26 becomes overburdened and may not be able to adequately service the requests in a timely manner, causing frustration to the subscribers.

Figure 2:
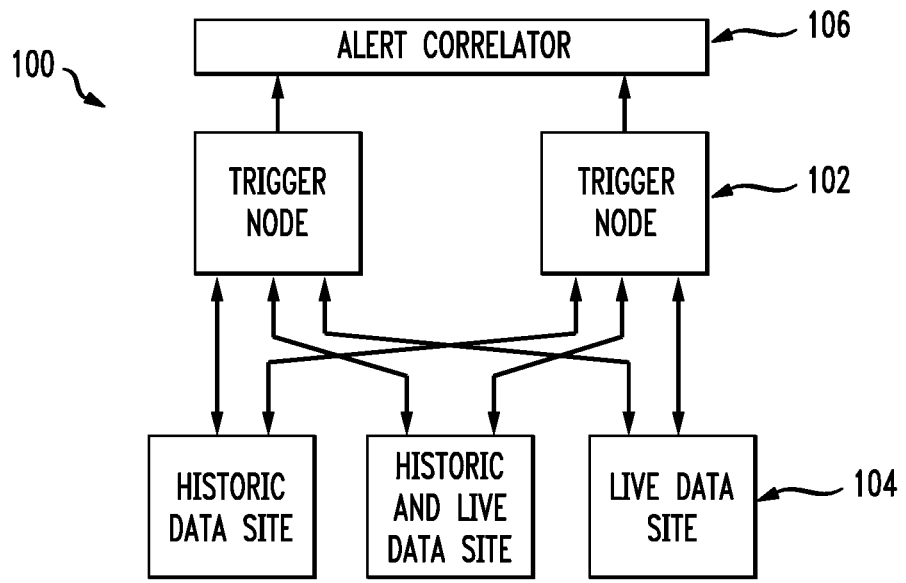
FIG. 2 is a block diagram of an exemplary triggered measurement architecture.
Figure 3:
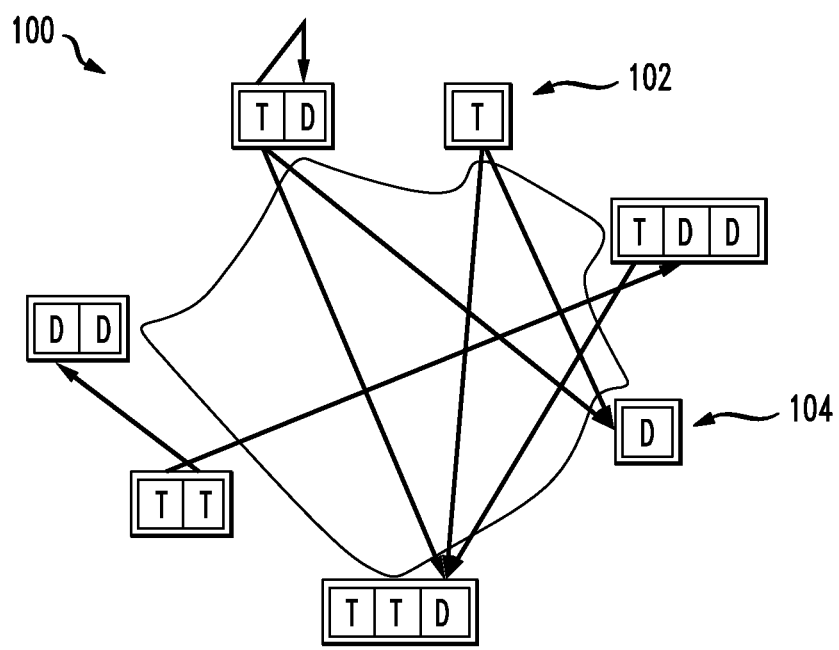
FIG. 3 is a block diagram of an exemplary computer network architecture having a plurality of trigger nodes and data sites.
Figure 4:
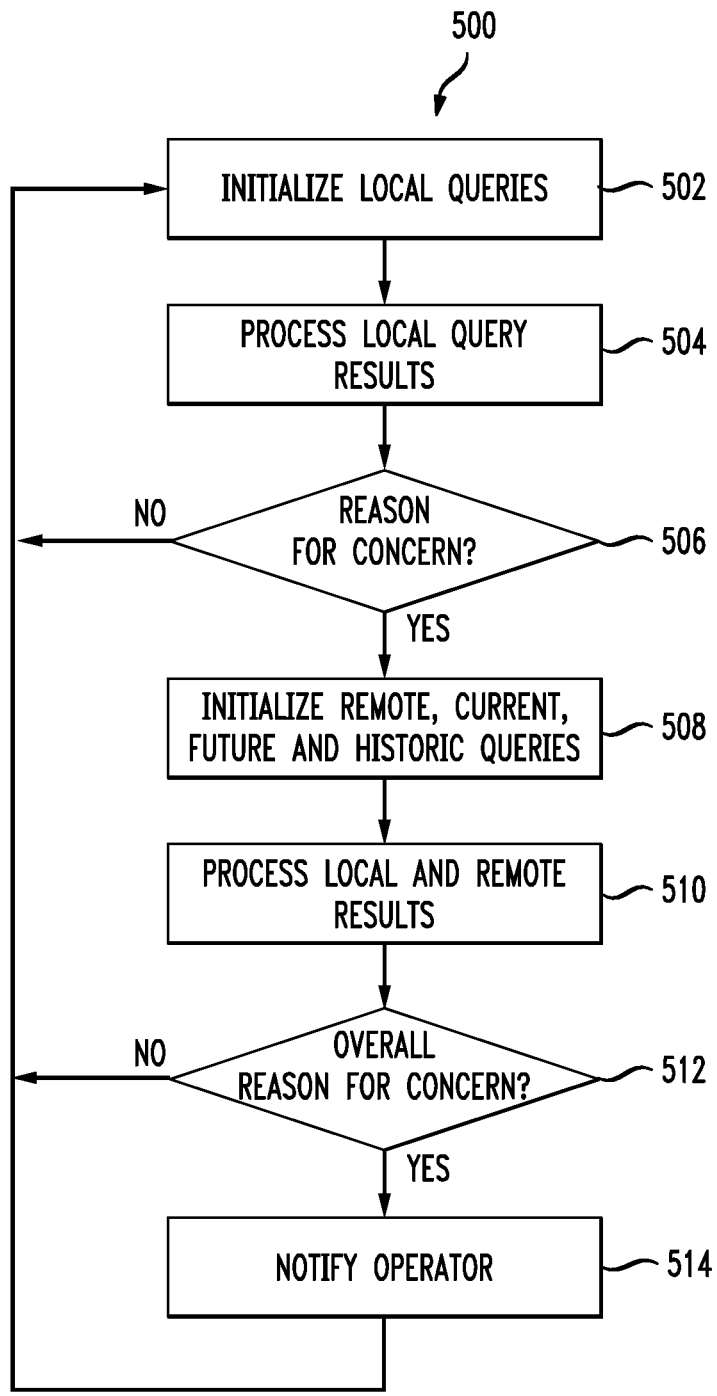
FIG. 4 is a flowchart of an exemplary monitoring process performed by a trigger nodes.

FIGS. 2-4 describe a system for triggered measurement of computer networks which is described in commonly assigned and copending U.S. patent application Ser. No. 10/945,240 which is hereby incorporated by reference. This triggered measurement technique is used to monitor and measure the health and capacity of the network 24 described in FIG. 1. In FIG. 2, there is depicted a first exemplary architecture 100 for triggered measurement of a computer network, referred to hereinafter as ATMEN. There are two main components in the ATMEN architecture: trigger nodes 102 and data sites 104. Both trigger nodes 102 and data sites 104 may be any computing device operating appropriate software. The trigger nodes 102 communicate with local and remote data sites 104 that can process multiple queries simultaneously in the presence of live traffic, and return query results to the trigger node 102. The trigger nodes 102 execute software code including a list of network queries available for various data sites 104, in order to obtain data on network traffic. Each available query acts as a resource to which a trigger node 102 can subscribe. The trigger nodes 102 are programmed to generate alerts when suspicious network activity is detected. This output from a trigger node 102 is referred to herein as an alert.

The effect of the alert may be defined within the ATMEN architecture by a human network administrator, and can include actions such as sending e-mail or text message to the network administrator, communicating an identification of suspect traffic to other trigger nodes 102, and requesting validating data from additional data sites 104. The varying sets of queries that can be processed by a data site 104 defines its capability.

The data sites 104 may include a repository of historic network traffic data, current network data being gathered regularly or dynamically, or a combination of the two. The network traffic data may be stored in various data formats at different data sites 104. The data sites 104 receive queries from the trigger nodes 102, and answer them using current and historic network data, as available, in response to the queries from the trigger node 102.

The various data sites 104 can be deployed with varying degrees of intelligence and capability. Some data sites 104 may be able to process large amounts of traffic by simply examining packet headers. Others may actually process the body of the packets and look for occurrences of specific strings. A data site 104 capable of processing only packet headers might send a query to other data sites 104 that are capable of examining packets in more detail. Some data sites 104 may use sophisticated real-time query processing systems that can dynamically handle new network queries. Others might be more simplistic network appliances that can handle only a fixed set of basic network queries without allowing further interpretation or processing. Still others may provide historic data either directly or post-processed via a wide variety of known database tools.

The various alerts generated from the trigger nodes 102 can be correlated in many ways. For example, an organization with multiple trigger nodes 102 can have an alert correlator 106, which may be any type of suitable computing device with appropriate programmed instructions to recognize alerts received from the trigger nodes 102. The alert correlator may further include any of a variety of known mechanisms for alerting a human network operator of an alert condition (such as by dispatching an e-mail message, text message, pager signal or the like to a programmed destination), and may be further programmed to respond to network alert conditions automatically (such as by transmitting instructions to reject suspect packets). In another example, a collection of organizations can collectively receive correlate the alerts received from various trigger nodes 102 using one or more alert correlators 106.

In various embodiments, the measurement steps may be selectively turned on and off for specific durations of time (in order to preserve processing and network bandwidth consumption) on a subset of cooperating trigger nodes 102, based on the occurrence of one or more events. The overall goal is to correlate the resulting data sets gathered at the various sites, and then examine them as a whole.

FIG. 3 shows how various combinations of trigger nodes 102 and data sites 104 can be situated on a computer network, for example, the Internet and communicate with each other. The trigger nodes 102 can communicate with one or more data sites 104 at different locations, for example, across the Internet. Additionally, some data sites 104 may be co-located with the trigger nodes 102.

ATMEN's practical applications include providing early warning mechanisms for occurrences of suspicious network events. The detection of such events can either be carried out by a single measurement trigger node 102 or may be the result of a joint decision made by combining information obtained from a group of trigger nodes 102. Consider a small shift in traffic patterns that a change detection software module of one trigger node 102 indicates could be of interest. If it is above the requisite threshold (which may be established based on historical traffic patterns), a control channel message may be delivered to other trigger node 102 indicating that modified measurements may be needed at that location. Alternately, there could be a lower threshold met which might trigger additional measurements at the other sites to look for the same event. If the traffic pattern shift involves a change in traffic of a particular kind, then an identification of the suspect traffic could be sent to the other trigger nodes 102, which, at their discretion, could modify their measurements of network traffic to accommodate queries regarding the identified suspect traffic.

In the case of a detection of a denial-of-service (DoS) attack or the occurrence of a flash crowd, a first trigger node 102 at location A could notice a sudden increase in traffic and identify the source of the suspect traffic using appropriate queries. In order to validate an alert condition, the first trigger node 102 may then notify other trigger nodes 102 at other locations. The other sites could then, in turn, start watching for similar packets and help collectively decide if an attack may be in progress, and if so, one or more alert correlators 106 could be notified. If one or more of the other trigger nodes 102 were already watching for a similar event, they could quickly return a measure of such packets based on their recent history. Otherwise, their monitoring could be adapted based on the information received from the first trigger node 102.

In the case of a flash crowd, significant increase in traffic to a Web server from a set of IP addresses belonging to prefixes that are not in the typical client set, could cause a trigger node 102 to notify other trigger nodes 102. The other trigger nodes 102 could examine traffic at certain ports to see if there is a sudden increase in traffic going to an identified destination address. A joint validation would permit a thorough evaluation and help decide if the event was indeed a flash crowd.

Other classes of practical applications include examining the shifts in the mix of network traffic. Studying similarities in accidental Border Gateway Protocol (BGP) announcements from multiple sites is useful in this regard. The effects of reacting to a particular set of BGP announcements could also be shared so that other sites can examine the effects of the reaction.

There is a compelling need for a short reaction time from the detection of the occurrence of any suspicious event, its validation, and the notification of an alert condition. We seek to provide the shortest possible reaction times in the design of our system. Providing trigger nodes 102 that are tailored to the specific needs of its network location, and which can exploit the various capabilities of different data sites 104, allows for quick, low-cost and effective monitoring capabilities. We want to take advantage of advanced query processing and data reduction facilities when available without excluding data from other less sophisticated sources. Accordingly, we describe the low-level structure needed for a distributed and heterogeneous trigger processing system. It should be readily appreciated that there are many approaches and architectures available to identify resources and launching queries, other than the specific examples provided hereinafter, and that the scope of the present disclosure is not to be limited thereby.

In the sections to follow, an exemplary description of the components within the ATMEN architecture, and how they may be integrated, will be presented. This is followed by a discussion of the performance of an implementation of this architecture using devices both in a laboratory setting and in the field, including high speed packet monitors, efficient software components (including an extensible communication language), and an ultra-fast processor of historical data that may be provided in a variety of popular network data formats. The results based on actual traffic demonstrate that the ATMEN architecture will easily scale to many nodes and be effective for many different types of network traffic measurement in real-world applications.

To allow arbitrary trigger nodes 102 to request data from arbitrary data sites 104, these capabilities have to be expressed in a global configuration language. Trigger nodes 102 may accordingly be configured with a set of available data sites 104 and a programmed set of active triggers that may be defined by a network administrator or may be based on historical traffic conditions. The trigger nodes 102 include programming instructions that use this information to determine what data sites 104 need to be contacted in order to support the active triggers. ATMEN allows the data sites 104 to deny trigger nodes 102 access to its data, in accordance with its programming. An implementation of ATMEN may or may not include the mechanisms to support the collaboration of mutually untrusted parties. In the descriptions of ATMEN herein though, it is assumed that all trigger nodes 102 and data sites 104 are mutually trusted parties, and thus, that the primary reason for denying a trigger node 102 access to a data site 104 is the lack of available resources on the data site 104 for responding to the trigger node's queries.

Turning now to FIG. 4, therein is show a high level flowchart of an exemplary monitoring process 500 performed by a trigger node 102 in conjunction with various data sites 104 within the ATMEN architecture. The triggers register some queries on an ongoing basis (step 502) and monitor the results of these queries (step 504). If no suspicious network activity is detected, the process 500 returns to step 502 above. If, on the other hand, one or more suspicious traffic patterns are detected at the local level (step 506), the trigger node 102 instantiates remote queries to other data sites 104 according to its programming (step 508). The remote queries can be about recent history or future traffic on the remote measuring node.

On the data site 104, ATMEN checks locally to see if there are enough resources available to fulfill the request. If so, the data site 104 provides the requested past, current, or future information requested by the trigger node. Otherwise, the trigger node's request may be rejected. After registering the remote queries (step 510), the trigger modules monitor the results to see if the remote data sites 104 have seen a similar anomaly. If, for example, more than a threshold number or fraction of the remote nodes have detected a similar anomaly (step 512), the triggers notify the alert correlator 106, and in turn the operator or network administrator (step 514), after which the monitoring process 500 is iteratively repeated. If, on the other hand, the threshold is not reached, the operator is not notified and the trigger returns to step 502 above.

Figure 5:
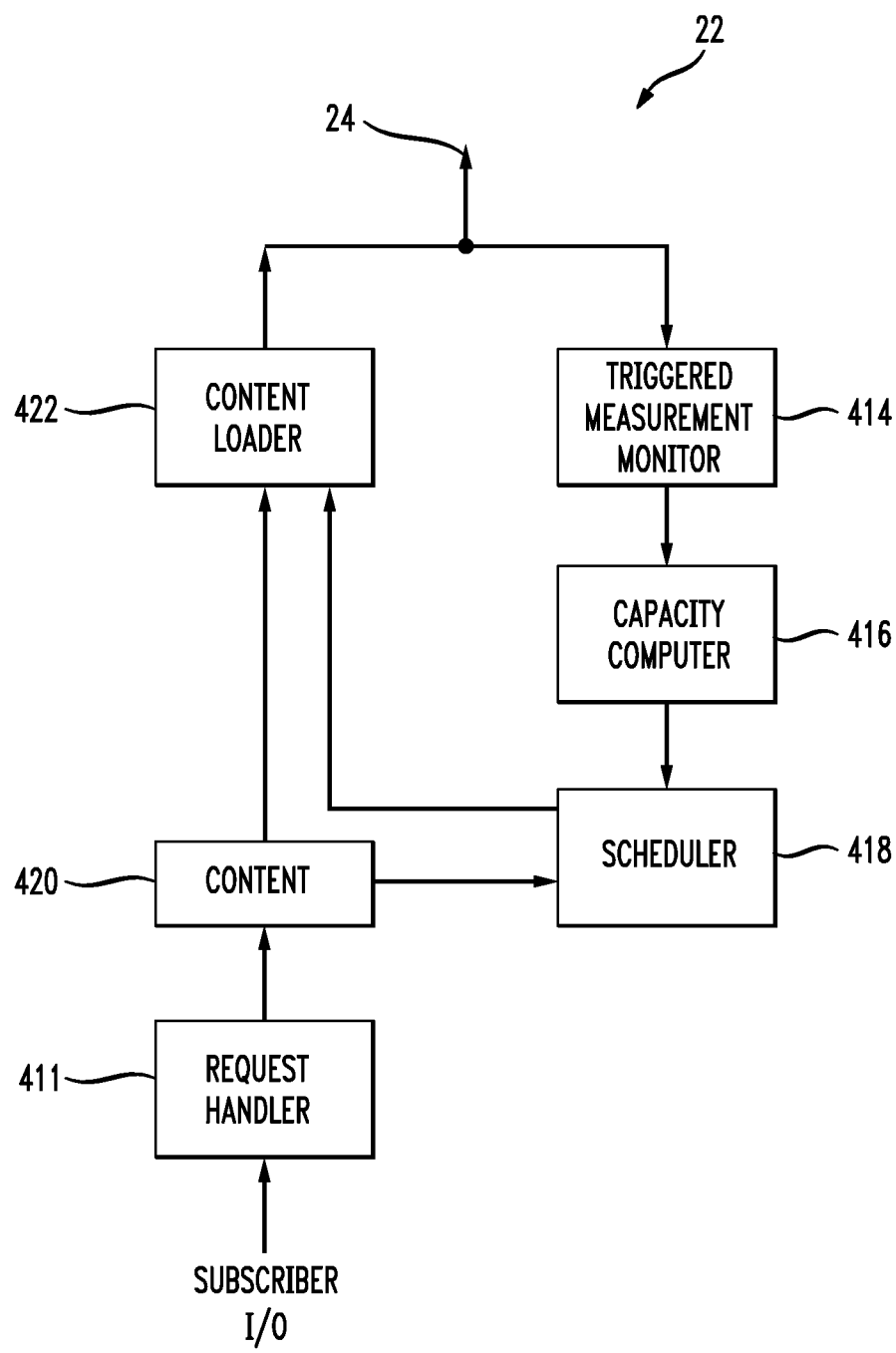
FIG. 5 is a block diagram of the functional components of a content provider of one embodiment of the invention.

FIG. 5 shows a functional block diagram of a content server 22 which enables scheduling of transactions according to an embodiment of the present invention. At its most fundamental level the content provider distributes content over a network to subscribers as network-wide transactions, such as program upgrades, syncing of databases, distribution of material to multiple parties, large scale content distribution and complex updates involving different regions of the internet. The subscribers send requests to the content server 22 for content available on the network.

The content server 22 has a subscriber request handler 411 which manages requests or load received from the subscribers. In the context of the network being the Internet, the subscriber computers run Web browser applications which generate requests in the form of universal resource locators (URLs). A URL describes everything about a particular resource that a Web browser needs to know to request and render it. The URL describes the protocol layers a browser should use to retrieve the resource, the name of the computer it is on, and the path and file name of the resource.

The "http://" portion of the URL describes the protocol. The letters "http" stand for HyperText Transfer Protocol, the set of rules that a browser will follow to request a document and the remote server will follow to supply the document. The website portion of the URL is the name of the remote host computer which maintains the document. The website may also contain a path and file name of the document on the remote host computer.

When the request handler 411 receives a request, the content server 22 locates the content to be delivered. The content server 22 has a triggered measurement monitor 414 for monitoring the internet. The monitor 414 is connected to and constantly monitors the health and load of the internet as stated above with respect to FIGS. 2-4. The monitor 414 is connected to a capacity computer 416 for dynamically computing, based on the monitoring performed by the monitor 414, the regions of the internet with available performance capacity for the transaction to proceed at a given time.

A scheduler 418 uses the results generated by the capacity computer 416 to determine, based on the computing by the capacity computer 116, a scheduled time for the transaction to proceed, or in other words, for the specific delivery of content over the Internet. The capacity computer 416 and scheduler 418 cooperate to enable intelligent scheduling of the delivery of the content. The content 420 is provided to the scheduler 418 for use in scheduling and to a content loader 422 for delivery over the internet according to a schedule related to the scheduled time determined by the scheduler 418.

Figure 6:
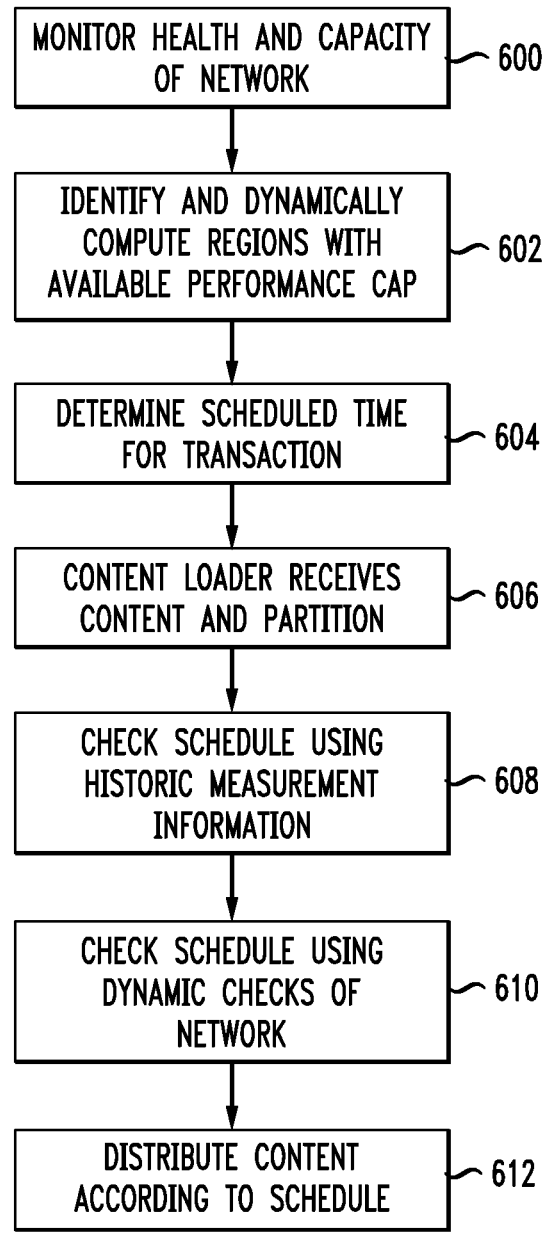
FIG. 6 is a flow chart of the steps of one embodiment of the invention.

The operation of the content server 22 to perform this intelligent scheduling according to an aspect of this invention is described in conjunction with reference to the flow diagram of FIG. 6. The content provider 22 performs the computer-implemented steps of FIG. 6. The steps are presented in the illustrated order for discussion purposes, but are not restricted to this sequence.

In step 600, the capacity computer 416 monitors the health and capacity of the internet or network using triggered measurement of the performance of an element of the network as described above. In step 602, the capacity computer 416 identifies and dynamically computes, based on the monitoring, regions of the network with available performance capacity for the transaction to proceed at a given time. This may be computed based on portion of the network that have a greater load, failures at certain protocol layers, performance levels of portions of the network and performance levels falling below certain pre-defined thresholds.

In step 604, using the information from the capacity computer 416, the scheduler 418 determines a scheduled time for the transaction to proceed.

In step 606, the content loader 422 receives the content 420 and partitions the content if needed. In step 608, the scheduled time is checked using historic measurement information.

In step 610, the scheduled time is checked using dynamic checks of the network. In step 612, the content is distributed according to a schedule related to the scheduled time.

Figure 7:
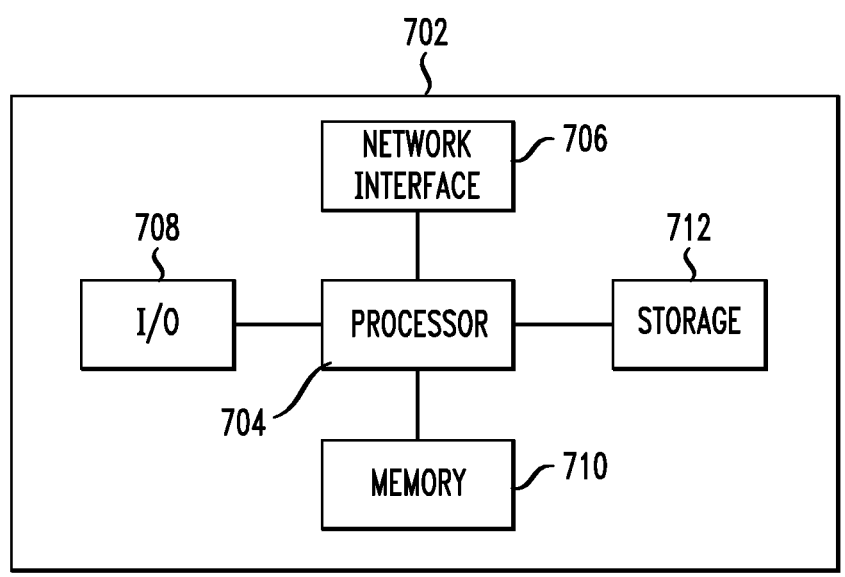
FIG. 7 is a high-level block diagram of a computer.

The content provider 22 may be any type of computer capable of taking requests and distributing content. For example, and without limitation, content server 22 described herein may be implemented using appropriately programmed general purpose computers. Such computers are well known in the art, and may be implemented, for example, using well known computer processors, memory units, storage devices, computer software, and other components. A high level block diagram of such a computer is shown in FIG. 7. Computer 702 contains a processor 704 which controls the overall operation of computer 702 by executing computer program instructions which define such operation. The computer program instructions may be stored in a storage device 712 (e.g., magnetic disk) and loaded into memory 710 when execution of the computer program instructions is desired. Thus, the functioning of the computer will be defined by computer program instructions stored in memory 710 and/or storage 712 and the functioning will be controlled by processor 704 executing the computer program instructions. Computer 702 also includes one or more network interfaces 706 for communicating with other devices via a network. Computer 702 also includes input/output 708 which represents devices which allow for user interaction with the computer 702 (e.g., display, keyboard, mouse, speakers, buttons, etc.). One skilled in the art will recognize that an implementation of an actual computer will contain other components as well, and that FIG. 7 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method comprising:
   determining regions of a network with available performance capacity for a transaction to proceed at a particular time based on triggered measurement monitoring of the network and failures of the network;
   generating a scheduled time for a particular transaction to proceed via a particular region of the network based on the determining; and
   initiating the particular transaction at the scheduled time via the particular region of the network.

2. The method of claim 1, wherein the triggered measurement monitoring is based on detecting a shift in a traffic pattern.

3. The method of claim 2, wherein the failures of the network occur at certain protocol layers.

4. The method of claim 1, wherein the determining is further based on a performance level of an element of the network falling below a threshold.

5. The method of claim 1, wherein the determining is further based on historic measurement information.

6. The method of claim 1, wherein the determining is further based on dynamic checks of the network.

7. The method of claim 1, wherein the determining is performed based on a load on the network.

8. An apparatus comprising:
   a processor; and
   a memory to store computer program instructions, the computer program instructions when executed on the processor cause the processor to perform operations comprising:
   determining regions of a network with available performance capacity for a transaction to proceed at a particular time based on triggered measurement monitoring of the network and failures of the network;
   generating a scheduled time for a particular transaction to proceed via a particular region of the network based on the determining; and
   initiating the particular transaction at the scheduled time via the particular region of the network.

9. The apparatus of claim 8, wherein the triggered measurement monitoring is based on detecting a shift in a traffic pattern.

10. The apparatus of claim 9, wherein the failures of the network occur at certain protocol layers.

11. The apparatus of claim 8, wherein the determining is further based on a performance level of an element of the network falling below a threshold.

12. The apparatus of claim 8, wherein the determining is further based on historic measurement information.

13. The apparatus of claim 8, wherein the determining is further based on dynamic checks of the network.

14. The apparatus of claim 8, wherein the determining is performed based on a load on the network.

15. A non-transitory computer readable medium storing computer program instructions, which, when executed on a processor, cause the processor to perform operations comprising:

determining regions of a network with available performance capacity for a transaction to proceed at a particular time based on triggered measurement monitoring of the network and failures of the network;

generating a scheduled time for a particular transaction to proceed via a particular region of the network based on the determining; and initiating the particular transaction at the scheduled time via the particular region of the network.

16. The non-transitory computer readable medium of claim 15, wherein the triggered measurement monitoring is based on detecting a shift in a traffic pattern.

17. The non-transitory computer readable medium of claim 16, wherein the failures of the network occur at certain protocol layers.

18. The non-transitory computer readable medium of claim 15, wherein the determining is further based on a performance level of an element of the network falling below a threshold.

19. The non-transitory computer readable medium of claim 15, wherein the determining is further based on historic measurement information.

20. The non-transitory computer readable medium of claim 15, wherein the determining is further based on dynamic checks of the network.

* * * * *